(12) United States Patent
Linderman (10) Patent No.: US 7,136,913 B2
(45) Date of Patent: *Nov. 14, 2006

(54) OBJECT ORIENTED COMMUNICATION AMONG PLATFORM INDEPENDENT SYSTEMS ACROSS A FIREWALL OVER THE INTERNET USING HTTP-SOAP

(75) Inventor: Michael Linderman, Nepean (CA)

(73) Assignee: Lab 7 Networks, Inc., Ottawa (CA)

( * ) Notice: Subject to any disclaimer, the term of this patent is extended or adjusted under 35 U.S.C. 154(b) by 1091 days.

This patent is subject to a terminal disclaimer.

(21) Appl. No.: 09/900,041

(22) Filed: Jul. 9, 2001

(65) Prior Publication Data

US 2002/0032790 A1 Mar. 14, 2002

Related U.S. Application Data

(63) Continuation-in-part of application No. 09/867,469, filed on May 31, 2001, now Pat. No. 7,007,094.

(60) Provisional application No. 60/242,708, filed on Oct. 25, 2000, provisional application No. 60/208,045, filed on May 31, 2000.

(51) Int. Cl.
G06F 15/173 (2006.01)
G06F 9/46 (2006.01)

(52) U.S. Cl. ............ 709/223; 719/318; 709/201; 709/217

(58) Field of Classification Search ........... 719/330, 719/318; 709/223, 200–205, 208–253
See application file for complete search history.

(56) References Cited

U.S. PATENT DOCUMENTS

| 5,544,154 | A * | 8/1996 | Glitho ............... 370/248 |
| 5,999,179 | A * | 12/1999 | Kekic et al. ........... 715/734 |
| 6,219,786 | B1 * | 4/2001 | Cunningham et al. ...... 713/152 |
| 6,333,932 | B1 * | 12/2001 | Kobayasi et al. ......... 370/389 |
| 6,457,066 | B1 * | 9/2002 | Mein et al. ............ 719/330 |
| 6,483,841 | B1 * | 11/2002 | Chang et al. ............ 370/412 |
| 6,772,216 | B1 * | 8/2004 | Ankireddipally et al. ... 709/230 |
| 6,970,935 | B1 * | 11/2005 | Maes ................. 709/230 |
| 2002/0010803 | A1 * | 1/2002 | Oberstein et al. ........ 709/318 |
| 2002/0099738 | A1 * | 7/2002 | Grant ................. 707/513 |
| 2002/0147745 | A1 * | 10/2002 | Houben et al. .......... 707/513 |
| 2002/0147746 | A1 * | 10/2002 | Lee ................... 707/513 |
| 2002/0149601 | A1 * | 10/2002 | Rajarajan et al. ........ 345/619 |
| 2002/0156874 | A1 * | 10/2002 | Suorsa et al. ........... 709/220 |
| 2002/0157023 | A1 * | 10/2002 | Callahan et al. ......... 713/201 |
| 2002/0161826 | A1 * | 10/2002 | Arteaga et al. .......... 709/203 |
| 2002/0178244 | A1 * | 11/2002 | Brittenham et al. ....... 709/223 |
| 2003/0005412 | A1 * | 1/2003 | Eanes ................. 717/120 |

(Continued)

OTHER PUBLICATIONS

"Simple Object Access Protocol (SOAP) 1.1", May 8, 2000, Box et al., pp. 1-35.*
"SOAP: The Simple Object Access Protocol", Aaron Skonnard, Jan. 2000, pp. 1-13.*

(Continued)

*Primary Examiner*—John Follansbee
*Assistant Examiner*—Haresh Patel
(74) *Attorney, Agent, or Firm*—Nath & Associates PLLC; Gregory B. Kang; Stanley N. Protigal (57) ABSTRACT

A system for communication over the internet and through a firewall utilizing a single communications protocol. A simple object access communications protocol (SOAP) is utilized. This protocol is an XML/HTTP based protocol for sending messages from one object to another across the internet in a platform independent manner. This type of protocol can be utilized to control network elements provided at various locations.

30 Claims, 6 Drawing Sheets

U.S. PATENT DOCUMENTS

2003/0036917 A1* 2/2003 Hite et al. .................... 705/1
2003/0131073 A1* 7/2003 Lucovsky et al. .......... 709/219
2004/0122833 A1* 6/2004 Forth et al. ................. 707/100
2004/0226010 A1* 11/2004 Suorsa ....................... 717/174
2004/0261020 A1* 12/2004 Layman et al. ............. 715/513

OTHER PUBLICATIONS

Skonnard, Aaron, SOAP, The Simple Object Access Protocol, Jan. 2000 issue of Microsoft Internet Developer, 13 pages.

"UPnP Device Architecture", Contributing Members of the UPnP Forum, Jun. 8, 2000.

* cited by examiner

OBJECT ORIENTED COMMUNICATION AMONG PLATFORM INDEPENDENT SYSTEMS ACROSS A FIREWALL OVER THE INTERNET USING HTTP-SOAP

CROSS-REFERENCE TO RELATED APPLICATIONS

The present application claims the benefit of U.S. provisional patent application No. 60/208,045, filed on May 31, 2000, and No. 60/242,708, filed on Oct. 25, 2000, as well as U.S. application Ser. No. 09/867,469, now U.S. Pat. No. 7,007,094, continuation in part (CIP) filed on May 31, 2001.

BACKGROUND OF THE INVENTION

1. Field of the Invention

The present invention relates to a software and hardware infrastructure allowing for the management of any network device regardless of its location utilizing only a single communications protocol.

2. Description of the Prior Art

Although a browser can be used to directly request images, video, sound etc. from a server, more usually, an HTML document converts the presentation of information served to the browser by a server. However, generally the contents of an HTML file are static in that the browser can only present a passive snapshot of the contents at the time the document is served. In order to present dynamic information, such as information generated by an application or device or to obtain from the user data which has been inserted into an HTML-generated form, conventional world wide web service employ a "raw" interface such as a common gateway interface (CGI). The HTML file provides no mechanism for presenting dynamic information generated by an application or device, except through the CGI.

With respect to obtaining data from a user for use by the application or device, although standard HTML provides a set of tags which implements a convenient mechanism for serving interactive forms to the browser, complete with text fields, check boxes and pull down menus, the CGI must be used to process submitted forms. Form processing is important to remote control, management, configuration, monitoring and diagnosing applications because forms processing is a convenient way to configure an application according to a user input utilizing the world wide web communications model. Unfortunately, form processing employing a CGI is extremely complex, requiring an application designer to learn and implement an unfamiliar interface. Therefore, a CGI is not a suitable interface for rapid development and prototyping of graphical user interfaces (GUI).

Furthermore, a developer must then master a native application source code language (such as C and C++), HTML and the CGI, in order to develop a complete application along with its user interface. Additionally, the CGI mechanism assumes access to the application on the customer's site, but not to the object. The person or process that invokes the CGI program must have full knowledge of that program. A firewall is not in control of the CGI. Therefore, the use of the CGI would make it impossible to fully secure communications between users. Finally, the CGI mechanism works only in the client server environment communicating to one server. This method cannot be applied to the distributed multi-process environment, if only a single communications protocol for the entire system is to be utilized.

Other systems could be used instead of the CGI. For example, an object model such as Microsoft's DCOM or the object management groups internet inter-ORB protocol (IIOP) or the common object request broker architecture (CORBA) could be employed. However, these technologies have some limitations when it comes to creating web services. For example, DCOM and IIOP/CORBA are rich environments, which means that implementations and applications that use them tend to be complex and symmetrical. In other words, to build a distributed application using them, one typically must require the same distributed object model running at both ends of the connection. However, the internet does not guarantee the specific kind of client or server software which would be running at the second end of the connection. All that is required is that the connection understands the hypertext transfer protocol (HTTP). Additionally, it is often technically impossible to insure that all applications would run either IIOP or DCOM.

Any server connected to the internet can potentially be accessed by an internet user, which raises some obvious security problems. To address these concerns, most organizations insert a firewall between their publically accessible web servers and the masses that can access the servers. Generally, a firewall can block incoming traffic based on various criteria and thereby increase an organization's confidence in the security of its system. While they are essential to the secure use of the internet, firewalls make the efficient use of distributed object protocols very challenging. Understanding why firewalls cause problems for distributed object protocols requires understanding of how a firewall is able to distinguish one protocol from another. For example, in the TCP/IP architecture, each widely used protocol is assigned its own port number and each request made using this protocol carries that number. HTTP, for example, is generally assigned port 80, while, for example, the file transfer protocol (FTP) relies on port 21. Most firewalls allow blocking a specific protocol by rejecting all traffic sent on the port used by that protocol. In general, firewalls are configured to allow traffic on port 80. If this was not the case, HTTP requests from browsers could not be received. However, many firewalls block most other ports. This would result in other protocols not being received by the user's local server.

Unlike HTTP, FTP and other widely used protocols, distributed object protocols do not generally have a single well known port number assigned to them. Instead, these protocols typically use dynamically assigned ports, with port numbers chosen arbitrarily as needed. If no firewall intervenes in the communication between the client and the server, this approach works fairly well. If a firewall is asserted, communication stops because the firewall blocks all traffic using this protocol since it is not configured to pass requests on arbitrary port numbers.

One response to this challenge is to use existing internet standards such as an HTTP and XML. More than any other application protocol, the HTTP connects most users to one another. Millions of web sites and browsers utilize protocol. The problem with HTTP alone is that it is mainly a mechanism for passing files from a server to a client. To create more ambitious web servers, the HTTP must be expanded.

One manner of extending the HTTP would be to use an object protocol such as the simple object access protocol (SOAP) copyrighted by IBM, Lotus Development Corporation, Microsoft and User Land Software. This protocol adds a set over the HTTP headers and rich XML payload to enable complex application-to-application communication over the internet. In other words, the SOAP messaging protocol uses HTTP to carry messages that are formatted with XML.

SUMMARY OF THE INVENTION

The deficiencies of the prior art are addressed by the present invention which is directed to a system utilizing an object access protocol as the single communications protocol between the user, any intermediate software system, and a network element (hardware). The invention utilizes the same object protocol, not only as the foundation of the internet communication, but also for the lower level inter-object communication. The system not only serves as a remote control for a network server across a firewall, but can also be used to control the switches running the network from the other side of the firewall. Because the server can utilize the simple network management protocol (SNMP) to configure the switches, the present invention would be able to control a network's back-end remotely, and will even be capable of changing bandwidth assignments. Because of its object access nature, the present invention is adaptable to control any network device be it a server, a switch, or any number of other devices such as network printers and fax machines. A host of emerging "smart" products including computer controlled appliances such as refrigerators and other kitchen appliances, climate control systems and medical devices can also be controlled.

The present invention is cross platform compatible since it is capable of running regardless of the platform because it is built in industry and standard protocols and is therefore not restricted to any given platform, thereby making a completely unique product.

The present invention will consist of a client and a number of servers. The client end would include a web browser interface enabling the utilization of HTTP compatibility with the SOAP which is designed specifically enable the transmission of XML payloads with special HTTP headers.

Every server of the present invention will run a parser filtering out the XML messages and sill translate these messages into necessary commands to be executed behind the firewall. The XML vocabulary will be translated into the necessary SNMP commands to be issued to the switches behind the firewall. The present invention will be scalable, thereby allowing for the addition of management capabilities by the integration of additional command protocols for communicating with other devices. The present invention will initially control devices that use the SNMP or Command Line Interface (CLI) protocol and can be scaled to add support for future protocols and devices as these become industry standards.

The architecture of the present invention allows a user to wrap existing or new communications equipment in a SOAP/XML wrapper, which would then allow for internet readiness or manageability via the internet anywhere in the world. The software wrapper is the computer program that understands object access protocol, i.e. contains a Protocol Virtual Machine (PVM), and runs on a single board computer, or on the hardware of the network element. A T-Box has a direct (not via the Internet) connection to the controlled network elements. The T-Box can communicate to the network elements via the Simple Network Management Protocol (SNMP) or Comment Line Interface (CLS) Additionally, a network management system would be utilized with the SOAP/XML protocol as the foundation for inter-object communication.

The SOAP protocol extends the XML into the remote procedure call (RPC) paradigm in a standardized manner. The present invention extends the simple RPC paradigm to a more complex useful transaction-based approach whereby a "call" by user could be chained through a series of servers each providing a telecommunications management network (TMN) hierarchy management level over the internet. This web chaining of the SOAP requests is a unique enhancement.

The SOAP infrastructure is important to the technology of the present invention. Available SOAP parsers had to be broken up and modified into client and server side parsing engines. Along with the new parsers, the purposes of asynchronous identifications, a connection pooling mechanism was developed upon which the SOAP messages rode. The utilization of this system would allow network elements to be remotely controlled beyond a firewall.

Other and further advantages, objects and features of the invention will become apparent to those skilled in the art from a reading of the following detailed description of a preferred embodiment of the invention when taken in light of the accompanying drawings.

DETAILED DESCRIPTION OF THE PRESENT INVENTION

Figure 1:
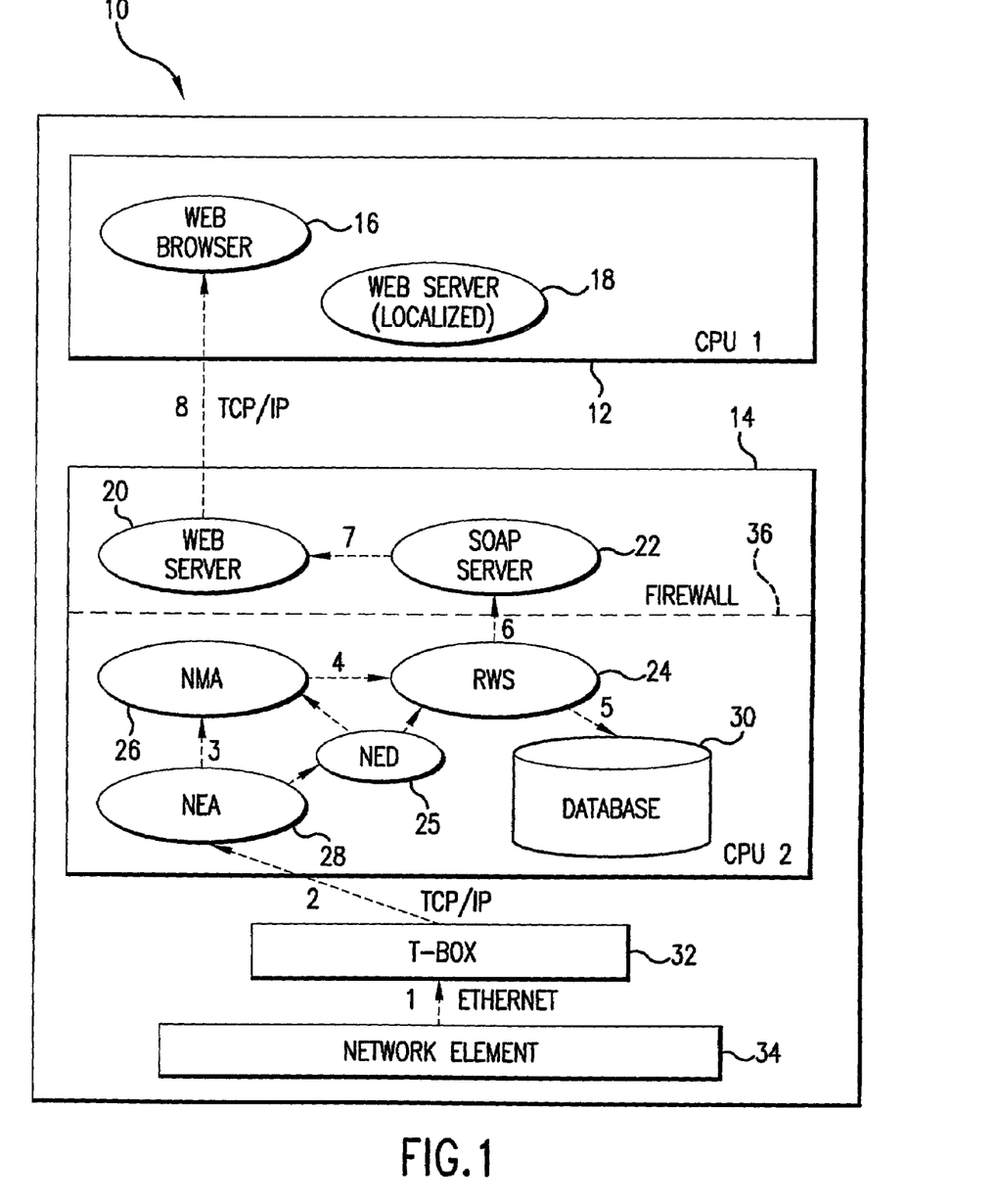
FIG. 1 is a block diagram showing the hardware of the present invention as well as an upward ordered message flow.
Figure 2:
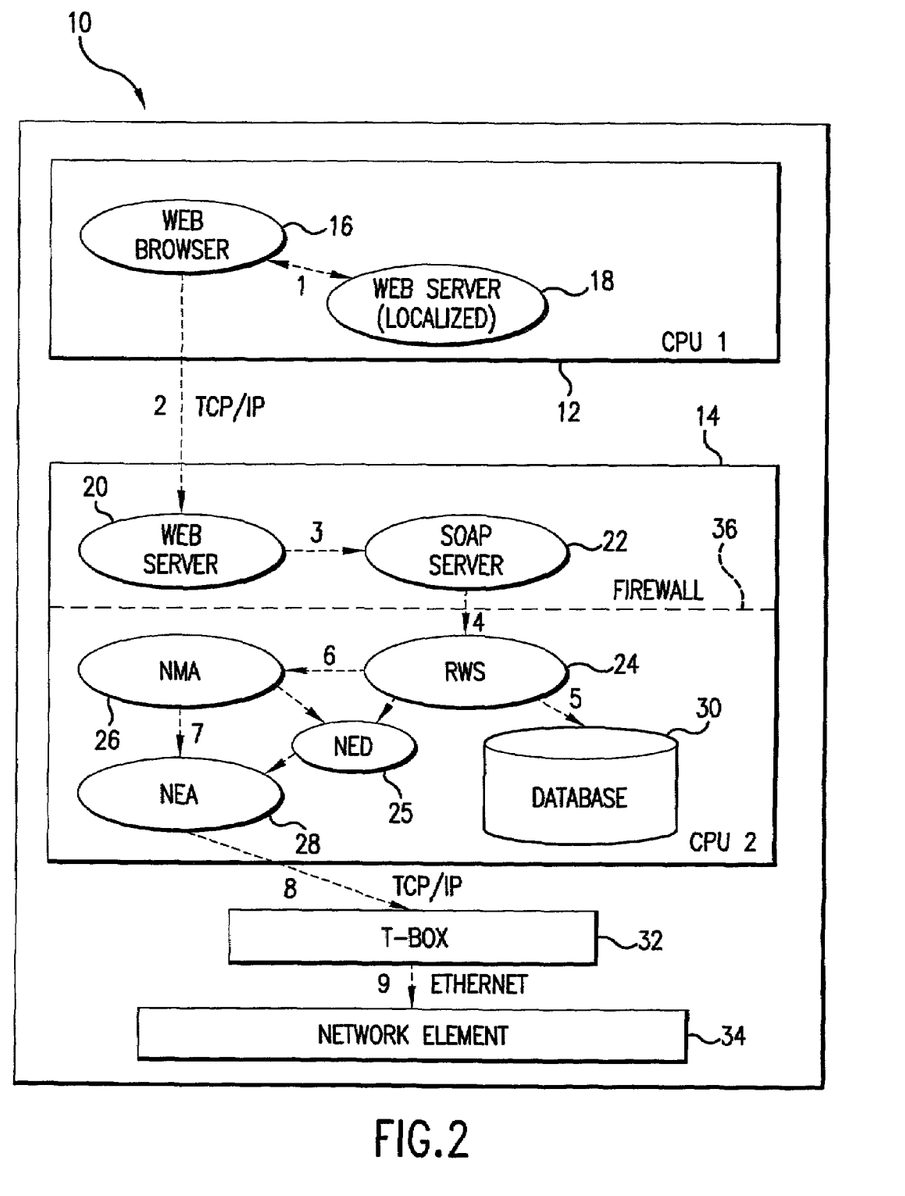
FIG. 2 is a block diagram of the present invention as well as showing a downward ordered message flow.

The system design 10 of the present invention is shown in FIGS. 1 and 2. As shown therein, separate CPUs 12 and 14 would include portions of the system hardware of the present invention. Note that the application can have as many CPUs as servers. We have shown two CPUs only for clarity reasons. The CPU 12 would include a web browser 16 associated with a GUI which is an applet loaded by the web browser from the localized web server 20. This would prompt the user for data to perform a particular command. Once the required data is entered, the command is encoded into an HTTP-SOAP message. Although the drawings illustrate the utilization of two CPUs, the present invention can employ as many CPUs as there are servers. The use of only two CPUs in the present invention was for clarity purposes only.

In this invention, the implementation of the SOAP message is similar to SNMP format. It recognizes the Managed Information Base (MIB) tree as the representation of hardware component structure. The difference is that in existing implementations of SNMP messages are usually numeric. For example, >Name-of-SNMP-program 10.3 set 23.21 11.11.2.12 2

The legend is: Name-of-SNMP-program node_address command (get/set) class.item object_id value.

Since SOAP is an XML based textual protocol, instead of numerals, it contains meaningful strings representing class, item, and object id in the component hierarchy. Within the SOAP envelope, the SNMP-like set of commands can be expanded if required.

Additionally, unlike most SNMP implementations, the present invention always guarantees the delivery of the message, referred to as "nailing connections". The receiving server in our system always notifies the sender.

The second CPU 14 would include a web server (Apache) which is the entry point of the network management system of the present invention. The web server 20 would determine if the message is a SOAP message. If this is the case, it would strip off the HTTP header and forward the remaining SOAP/XML message to the SOAP server 22. This server is a servant container which, upon receiving a SOAP message, a determination would be made to which server the message is destined. In this instance, the message will always be routed from or to a read/write server (RWS) 24. Upon receipt of the message from the SOAP server 22, the RWS 24 will store the data in a generic model in a relational database 30 in an object to relational table mapping. The RWS 24 will then forward or receive the message from a network management agent (NMA) 26.

The NMA 26 will then determine the course of action required for the particular type of request or command and build the appropriate model for it using G.855, G.85X recommendations as its basis. The NMA 26 will then forward commands to or receive comments from various network element agents (NEA) 28. Although a single NEA 28 is shown in FIGS. 1 and 2, it is noted that a number of NEAs can be employed. The NEA 28, upon receiving a nodal command from the NMA 26 will the build a M.3100 management model to support the nodal action. The NEA 28 will then forward a smaller command to a translation device (T-box) 32 for processing or translation. The T-box 32 then translates the SOAP command into the native language of the intended device such as network element 34, or SNMP.

The web browser 16 will generally be a third party provided browser. Most personal computers come with a preinstalled browser or can easily be downloaded. Both Netscape and Internet Explorer will be supported as both are Java enabled. However, it is also possible to use either front end applications written in any other computer language, as long as they are talk SOAP/XML. The web browser 16 will upload applets from the web server 18 for procedural contacts and communicate the network data transactions back to the web server 20 to be forwarded to the RWS 24. When a user is selecting a network element or set of network elements to perform an action, a network element record must already have been installed into the database 30 for that network element. The user will only be allowed to select from the list of network elements currently being managed. The web browser will also receive asynchronous events from the web server and display them.

The RWS 24 will receive or send user requests and store them in the database 30 as they are received. After a successful storage, a SOAP envelope will be sent to the NMA 26 to begin execution of the user request. The RWS 24 will also forward alarms to the web server 20 for display when it receives them from lower layer processors such as an NEA 28.

The NMA 26, when triggered by the RWS 24 will initiate processing of the user request. The NMA 26 will read and parse the SOAP request and then build a model required to satisfy that request. The NMA 26 will send a series of SOAP encoded singular node access requests to the NEA each with the data sufficient to satisfy the secondary request. Thus, a typical NMA network request is broken down into a set of simpler nodal requests. The NMA will implement a standard space model in order to satisfy the network management layer requirement. The NMA will process the request to either a successful or error termination condition. The NMA will log the cumulative status of the user request and also send a response SOAP packet back to the RWS 24 to be forwarded to the user. The NMA 26 will store the data required for each nodal requested to the database 30. Each NMA request and secondary NEA request all will have unique transaction Ids and database tables.

A Network Element Discovery server (NED) 25 can be provided between the NMA 26, the RWS 24 and the NEA 28 included in FIGS. 1 and 2. The NED will discover and store in the database 30 each network element's configuration. The configuration data may contain port, card, slot and shelf information. It may also discover the current set of provisional connections and their states.

The NED 25 will use the NEA 28 for access to the network elements in order to perform its discovery task. The NED will be used to populate the database tables initially. It will also perform an Audit/Learn function.

It is noted that a firewall 36 separates the web browser 16, the web server 20 and the SOAP server 22 from the remaining elements of the system.

The NEA 28 will be triggered from a SOAP envelope received from the NMA 26. The NEA will parse the XML document which encompasses the data necessary to complete a single nodal transaction. An M.3100 derivative model will be used to satisfy the elemental management layer requirement. The NEA 28 will proceed to encode the appropriate SOAP packets to be delivered to one or more of the T-boxes 32 which are managing the network elements to where the request is destined. Although FIGS. 1 and 2 show the T-box 32 connected to a single network element 34, it can be appreciated that a single T-box can manage several network elements. To explain, one T-box can manage several network elements. When a success or failure message is received, the status is then stored in the database for logging purposes and then the status is sent back to the NMA 26.

The purpose of the database 30 is of course to store information. Once a user hits the appropriate button on the browser 16, an NMA request will be received by the RWS 24 and immediately stored in the database. Additionally, each NEA request is stored in the database before being processed by the NEA 28. Furthermore, the configuration of each network element is also stored in the database 30.

The T-box 32 contains embedded software. The T-box will be able to receive "M-GET", "M-SET" and "M-ACTION" requests via the SOAP interface, as well as command line interfaces (CLI). The T-box will translate the SOAP command into the appropriate native console command (MML), (CLI) or SNMP, and send it via an ethernet interface to the actual network element in order to satisfy the given NEA request.

The HTTP-SOAP protocol provides the present invention a method of information exchange between functional components. Similar to any messaging protocol, it provides for data encapsulation with messages. The HTTP-SOAP protocol includes an envelope defining a framework for describing what is in a message and how to process it. It also includes a set of encoding rules for expressing instances of application defined data types as well as a convention for representing remote procedure calls and responses.

It is important to note that the T-box can control the network element from the applet directly to the T-box without control from additional servers. The applet is a JAVA program that runs within the web browser. However, any application written in any language can talk to the network element through the T-box using SOAP as one protocol.

An upward flow of data from a network element 34 to the web browser 16 in the first CPU 12 will now be described. The network element 34 sends a message to the T-box 32 over, perhaps, the ethernet as shown by Step 1. The T-box 32 includes a parser therein and utilizes the parser to translate the response received from the network element 34 into a SOAP response and sends this response to the NEA 28 at Step 2. It is noted that a plurality of NEAs would be utilized and the message relayed from the T-box 32 would be sent to the NEA 28 which is managing that particular network element. At Step 3, the NEA 28 forwards the nodal response created therein to the NMA 26. The NMA then forwards the entire transaction response to the RWS 24 at Step 4. The RWS 24 will then forward this response to the SOAP server 22 at Step 6, as well as to the database 30 at Step 5. The SOAP server 22 would then forward the response to the web server 20 which in turn would send the response back to the web browser 16 in the first CPU 12.

FIG. 2 illustrates a downward message flow from the CPU 12 ultimately to a network element 34. Initially, the web browser 16 will connect to the web server 20 at Step 2. In this case, the web server will automatically upload the applet that will prompt the user for a command and a set of attributes used to control the network element 34. If authorized by the user, the web browser 16 would then be connected to the web server 20 in the second CPU 14 as shown by Step 2. At this point, the web browser will then build and send an HTTP-SOAP envelope to the web server 20. Upon receipt of the SOAP envelope, the web server 20 will immediately route it to the SOAP server 22 as shown by Step 3. Once the SOAP server 22 determines that a proper request has been made, it will be forwarded across the firewall 36 to the RWS server 24 as shown by Step 4. At Step 5, the RWS 24 will modify the request if required and then store it in the database 30. The RWS server will also forward the request to the NMA 26 as shown by Step 6. The NMA 26 will process this message and forward the necessary subcomponents to the proper NEA 28 for nodal processing. Step 8 indicates that the NEA 28 will forward the appropriate single-space command to the T-box 32. The T-box 32 will formulate and send the proper translation for the command to the network element 34 across the ethernet as shown by Step 9.

Figure 3:
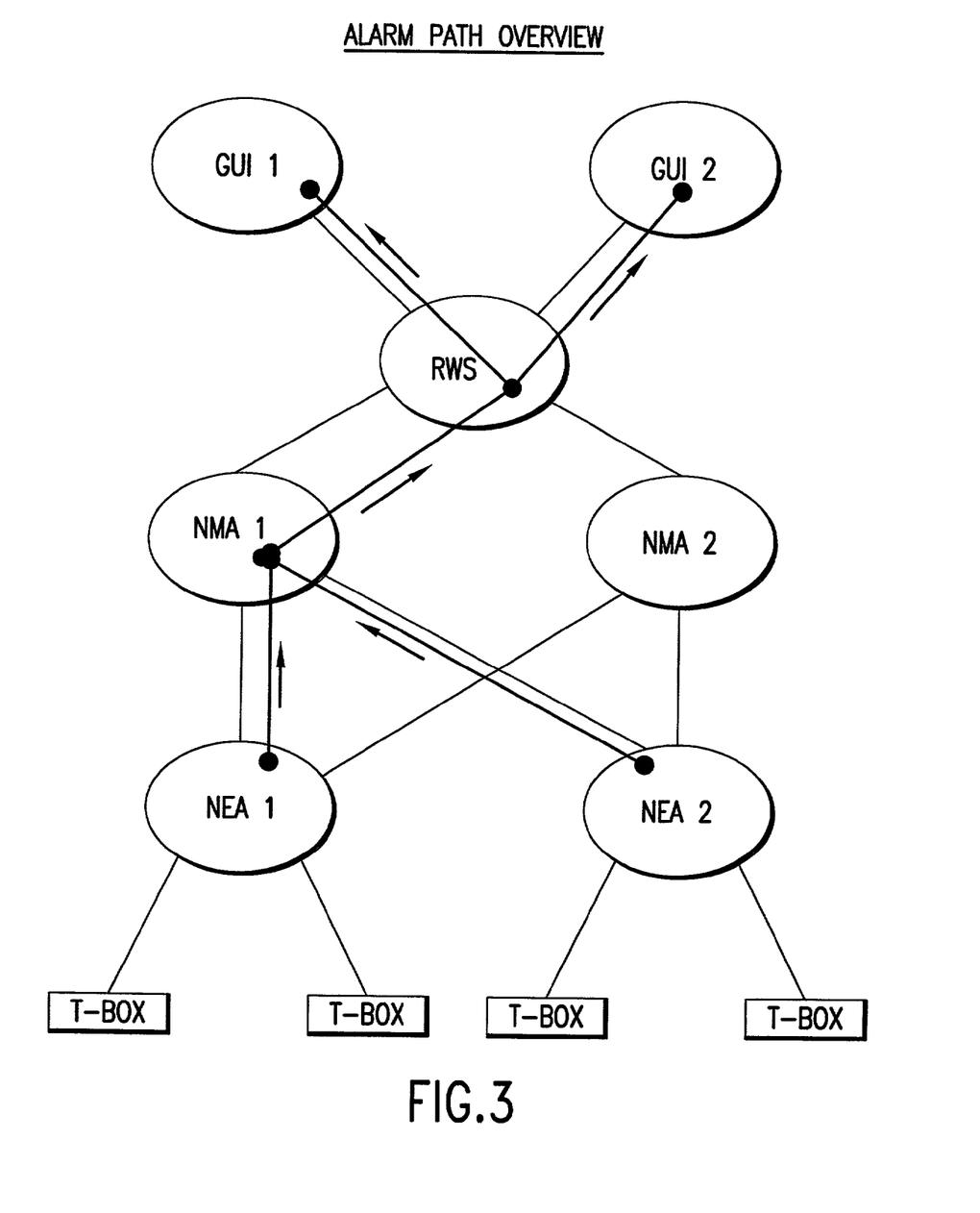
FIG. 3 is a diagram showing an alarm path flow.
Figure 4:
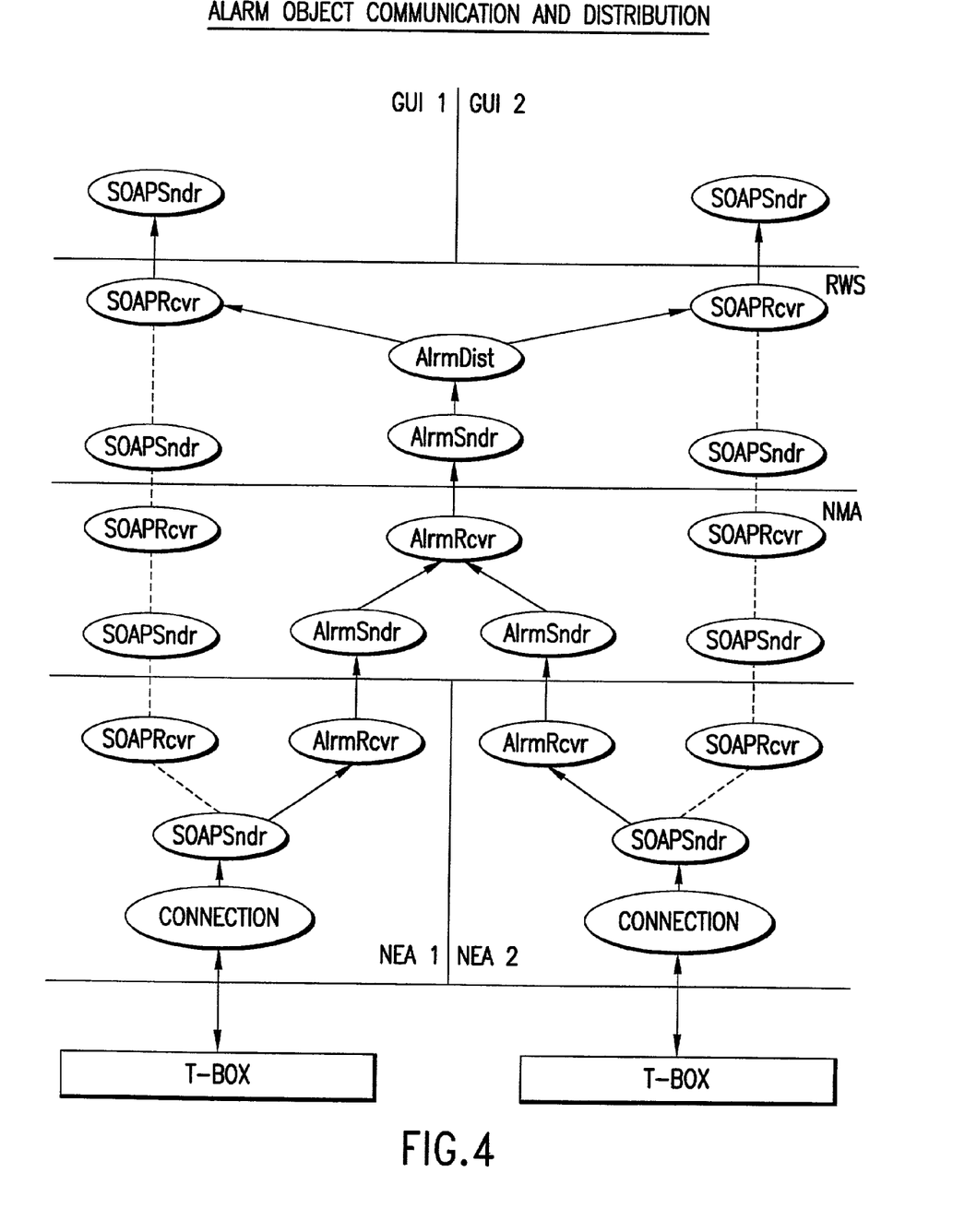
FIG. 4 is a diagram showing alarm object communication and distribution.

FIGS. 3 and 4 illustrate the alarm path network of the system of the present invention also indicating that the architecture is very scalable and allows for several NMAs as well as several NEAs and one or more GUIs and T-boxes. As alarms are received by the NEAs, they are immediately forwarded to the NMA for further processing and forwarding. Alarms can be received by the NEA at any time and are discriminated via the header field. Thus an in-progress provision cannot get confused with alarms being interpreted as responses. The directions of the alarm message will be from the Network Element to the T-Box and then to the NEA. The alarm will then proceed to the NMA, the RWS and the GUI (web browser). The alarms, by nature, go from the hardware equipment to the web browser.

A user that connects to the RWS from a GUI will register with the alarm distributor class for alarms. As alarms are received by the NEA, they are immediately forwarded to the NMAs for further processing and forwarding. Alarms can be received by the NEA at any time and are discriminated via the header field. The header attribute "alarm" indicates to the SOAP senders that this is an alarm data object. The body attributes contained in the rest of the alarm information. These attributes are such as NE name and message text.

The present invention employs a TCP/IP network with a connection to the internet. The network has a firewall between itself and the internet. It is possible for a network administrator to access and configure all equipment on the network through the use of telnet, SNMP, and other network management tools. These tools can only be used from behind the firewall. The firewall will, however, prevent these connections from being made from behind the firewall. With the present invention, it is now possible to HTTP connections which are still left open by the firewall to send in SNMP commands to the equipment beyond the firewall. This would allow the present invention to control the bandwidth being assigned to any part of network. This would also enable ISPs and other providers of bandwidth to sell bandwidth in a more dynamic manner because the bandwidth could be adjusted to meet demands more quickly and easily than currently possible.

The present invention also has the ability to allow a single network administrator to administer networks in different geographic locations. For example, if a service provider is located in Canada, network elements can be connected to a T-box in Canada utilizing a serial cable, an ethernet cable to a hub. The provider would then send email to a customer located, for example, in the United Kingdom confirming this connection. The customer would then email to an engineering technical support team located, for example, in China so that it can assign the correct IP addresses to the switches through a web interface. After these addresses are quickly assigned, the switches are registered for technical support if debugging will be required. The debugging of the switch can be done in various locations through the web interface. Once the registration is completed, the user will start provisioning of the network element using the web interface. Using one or more of the screens of the GUI, the provider in Canada will make selections relating to various equipment that must be connected. When the T-box in Canada receives a generic command, it will make a decision to translate this to CLI or SNMP for the network element. Most of the debugging commands usually include CLI access.

In a second scenario, several computers and peripheral devices are connected to one switch. It is noted that this switch can be used to enable or disable different ports that are used to connect the different devices together via the switch. Furthermore, the speed of the data that travels through these ports can also be altered.

In this manner, traffic can be regulated through the system. Alternatively, different virtual local area networks can be created and connected to that one switch. This is done for the purposes of isolating data that users can share on the computers or to isolate peripheral devices.

The present invention can be utilized to control "smart" devices such as computerized appliances and the like. In a home computerized environment, equipment can help the homeowner with climate control. The present invention can interface with electrical, wired or wireless devices or equipment. In such a scenario, the present invention can be used to program these devices and help in the automation process. The present invention is also capable of interfacing with wireless data systems and devices as well as interfacing with medical devices, distant learning equipment and various other telecommunications equipment.

The present invention offers a highly distributed network management application by using an XML based communication protocol. The translator for the XML based protocol to SNMP or TL1 can be embedded in a small hardware device serving as a web server controlling a number of network elements.

Figure 5:
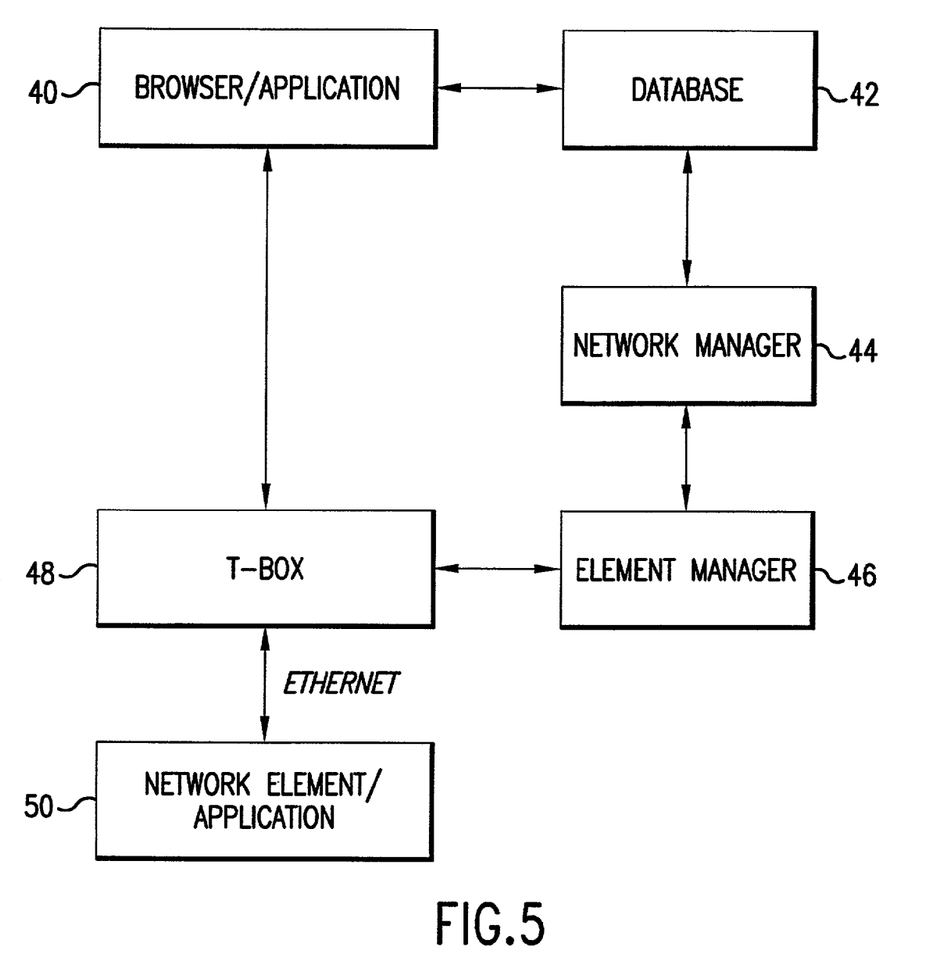
FIG. 5 is a diagram showing an alternate embodiment of the present invention.

FIG. 5 illustrates an alternate embodiment of the present invention in which a user request is transmitted directly from a browser/application 40 to the T-box 48 and then to the network element or application 50 instead of proceeding directly through a database 42, network manager 44 and element manager 46 as illustrated in FIGS. 1 and 2. A graphical user interface (GUI) is used to control the communications between the browser/application 40 and the network element/application 50 directly through the T-box 48 or indirectly through the network manager 44 and element manager 46. As shown by the double headed arrows, communication is provided either upwardly or downwardly directly through the T-box 48 or indirectly through the T-box and database 42, network manager 44 and element manager 46.

The T-box 48 is provided with both a SOAP server as well as the PVM. The GUI is provided with two input devices on the screen. These input devices would indicate whether the user request is to proceed directly to the T-box 48 or via the network management system shown in FIGS. 1 and 2. As illustrated in FIG. 5, this network management system would include the database 42, the network manager 44 as well as the element manager 46. This is important since if the network management system is not operating, communication can still be provided from the browser application 40 directly to the T-box 48 and then to the network element/application 50. It is important to note that this communication can also proceed from the network application 50 to the T-box 48 and then directly to the browser/application 40. This is true since the T-box 48 can transfer a user request from a native language into SOAP as well as translate the SOAP packet into the native language.

The user can also specify whether a native command or generic command would be utilized. Generally, the user would not concern themselves with the command names that were given to a particular vendor. In this case, the user would utilize the generic command set. The GUI would include NE NAME as a pop down field automatically populated with the names of the network elements. For example, these names might correspond to LAB 7 Router, 1548M Cisco switch and UofORouter corresponding to the Cisco 7000 router.

The present invention utilizes the following commands: Connect, disconnect, setVlan, showVlan, setPortUp as well as setPortDown.

The input data includes parameters that the user can set. For example, in the case of the Virtual Lan (setVlan), the user can specify which port is connected to which Vlan. After making a selection, the user can submit the request. An applet will create the SOAP message and send it through the selected path. Request and reply log area will display the appropriate logs and the user interpretation view will display logs and alarms coming from the equipment.

It is noted that FIGS. 1 and 2 show the use of the present invention sending user requests from a browser/application to a network/application through at least one firewall. FIG. 5 indicates that the present application would also operate in a situation in which no firewalls are present. However, it is noted that all of the embodiments can operate with or without firewalls.

Figure 6:
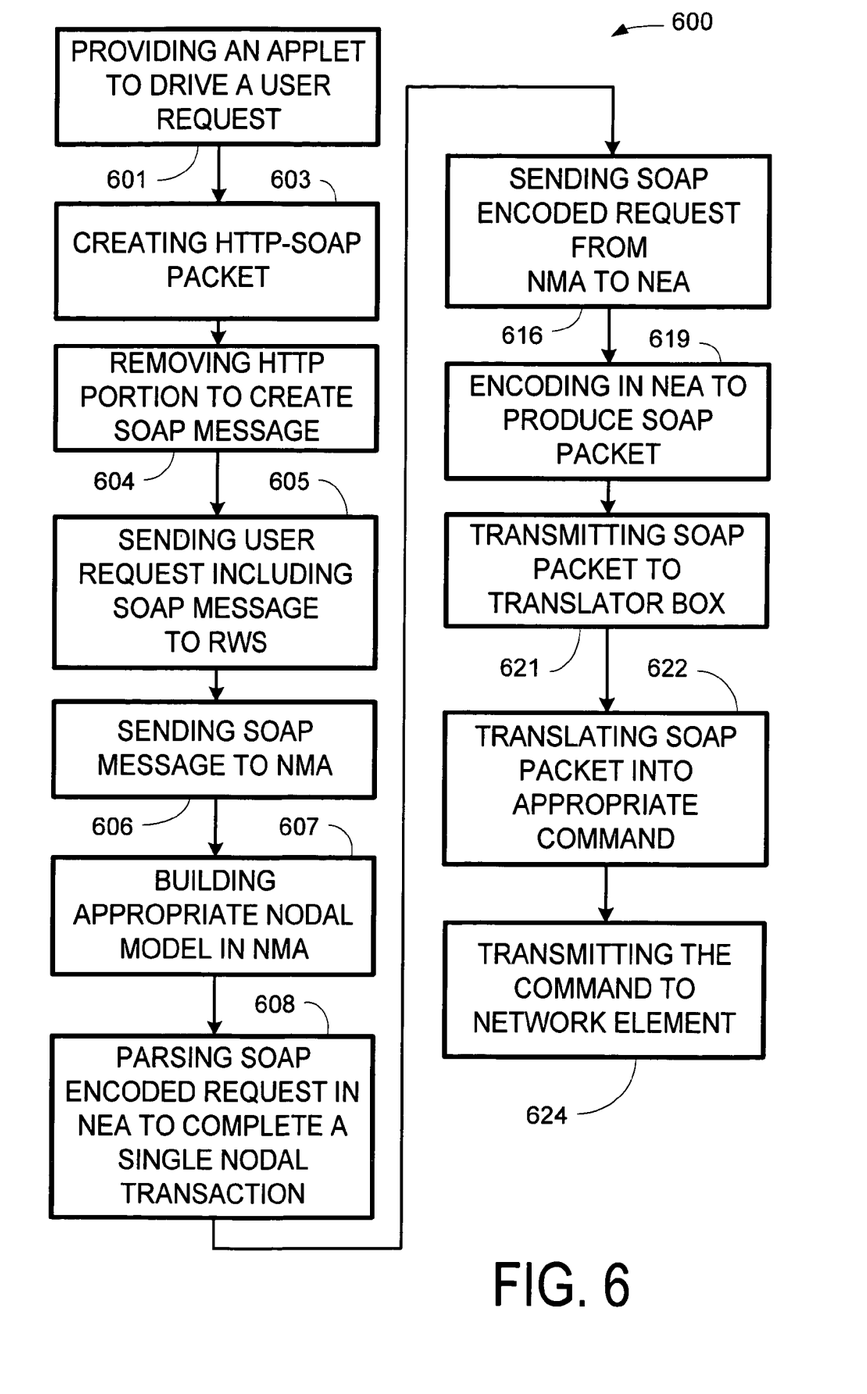
FIG. 6 is a flow diagram showing the operation of the present invention.

FIG. 6 is a flow diagram showing the operation a method 600 for communicating between an application source located on a first side of a firewall and a network element located on a second side of the firewall, according to the present invention. An applet to drive a user request is provided (Step 601). The applet is provided to the application source by a web server included on a first side of a firewall and sent to a read/write server provided on a second side of the firewall. A hypertext transfer protocol-simple object access protocol (HTTP-SOAP) packet of said user request is created (Step 603). The HTTP portion of the HTTP-SOAP packet is removed (Step 604) in order to create a SOAP message. A user request including the SOAP message is sent to the RWS (Step 605). The SOAP message is then sent to the NMA (Step 606). An appropriate model is built in the NMA (Step 607) and the SOAP encoded request is parsed in the NEA (Step 608) to complete a single nodal transaction. A SOAP encoded request is then sent from the NMA to the NEA (Step 616) and the data is encoded in the NEA to produce the SOAP packet (Step 619). The SOAP packet is transmitted to the translator box (Step 621) and the SOAP packet is translated into an appropriate command (Step 622). The command is transmitted to the network element (Step 624).

Whereas the preferred form of the present invention has been shown and described herein, it should be realized that there can be many modifications, substitutions and alterations thereto.

What is claimed is:

1. A method for communicating between an application source located on a first side of a firewall and a network element located on a second side of the firewall, comprising the steps of:

providing the application source with an applet to drive a user request, said applet provided by a web server includes on the first side of the firewall;

creating a hypertext transfer protocol-simple object access protocol (HTTP-SOAP) packet of said user request removing the HTTP portion of said HTTP-SOAP packet to produce a SOAP message;

sending said user request including said SOAP message to a read/write server provided on the second side of the firewall;

transmitting said SOAP message to a network management agent (NMA) server provided on the second side of the firewall;

building an appropriate nodal model of said user request, including said SOAP message, in said NMA server provided on the second side of the firewall;

sending SOAP encoded requests from said NMA server provided on the second side of the firewall to a network element agent (NEA) provided on the second side of the firewall;

parsing said SOAP encoded requests received by said NMA server provided on the second side of the firewall in said NEA which encompasses data needed to complete a single nodal transaction;

encoding in said NEA, said SOAP message to produce SOAP packets;

transmitting said SOAP packets to a translator box associated with the network element, said translator box located on the second side of the firewall;

translating said SOAP packets into an appropriate command for the network element; and transmitting said command to the network element located on the second side of the firewall.

2. The method in accordance with claim 1, further including the step of providing said web server at a localized location with respect to the application source.

3. The method in accordance with claim 1 further including the step of transmitting in a simple object access protocol encoded request a network element configuration data from said NMA server provided on the second side of the firewall to a network element discovery network server (NED).

4. The method in accordance with claim 3, wherein said network configuration data comprises port, card, slot and shelf information.

5. The method in accordance with claim 1, further including the step of modifying said user request prior to sending said request to said NMA server provided on the second side of the firewall.

6. The method in accordance with claim 1, further including the step of transmitting said user request to a database for storage.

7. The method in accordance with claim 5, further including the step of transmitting said user request to a database for storage.

8. The method in accordance with claim 1, the application source for communicating with a plurality of network elements located on the second side of the firewall, further including the steps of:
 including a plurality of NEAs, each of said NEAs controlling at least one of the network elements; and
 transmitting said SOAP encoded requests to a proper NEA.

9. The method in accordance with claim 8, further including the steps of:
 including a plurality of translator boxes, each of said translator boxes controlling at least one of the network elements; and
 transmitting said SOAP packets to a proper network element.

10. The method in accordance with claim 1, further including the step of translating said SOAP packets into an appropriate command in said translator box understood by the network element.

11. A method for communicating between an application source located on a first side of a firewall and an application located on a second side of the firewall, comprising the steps of:
 providing the application source with an applet to drive a user request, said applet provided by a web server included on the first side of the firewall;
 creating a hypertext transfer protocol-simple object access protocol HTTP-SOAP packets of said user request;
 removing the HTTP portion of said HTTP-SOAP packet to produce a SOAP message;
 sending said user request to a read/write server provided on the second side of the firewall;
 transmitting said SOAP message to a network management agent (NMA) server provided on the second side of the firewall;
 building an appropriate nodal model of said user request, including said SOAP message in said NMA server provided on the second side of the firewall;
 sending SOAP encoded requests from said NMA server provided on the second side of the firewall to a network element agent (NEA) provided on the second side of the firewall;
 parsing said SOAP encoded requests received by said NMA server provided on the second side of the firewall in said NEA which encompasses data needed to complete a single nodal transaction;
 encoding in said NEA, SOAP message to produce SOAP packets;
 transmitting said SOAP packets to a translator box associated with the application, said translator box located on the second side of the firewall;
 translating said SOAP packets into an appropriate command for the application; and
 transmitting said command to the application located on the second side of the firewall.

12. The method in accordance with claim 11, further including the step of providing said web server at a localized location with respect to the application source.

13. The method in accordance with claim 11, further including the step of modifying said user request prior to sending said request to said NMA server provided on the second side of the firewall.

14. The method in accordance with claim 11, further including the step of transmitting said user request to a database for storage.

15. The method in accordance with claim 13, further including the step of transmitting said user request to a database for storage.

16. The method in accordance with claim 11, for communicating with a plurality of applications, further including the steps of:
 including a plurality of NEAs, each of said NEAs controlling at least one of the applications; and
 transmitting said SOAP encoded requests to the proper NEA.

17. The method in accordance with claim 16, further including the steps of:
 including a plurality of translator boxes, each of said translator boxes controlling at least one of the applications; and
 transmitting said SOAP packets to the proper applications.

18. The method in accordance with claim 11, further including the step of translating said SOAP packets into the appropriate command in said translation box understood by the application.

19. A method for communicating between an application source and an application, comprising the steps of:
 providing the application source with an applet to drive a user request; creating a hypertext transfer protocol-simple obiect access protocol (HTTP-SOAP) packet of said user request;
 removing the HTTP portion of said HTTP-SOAP packet to produce SOAP message;
 sending said user request to a read/write server;
 transmitting said SOAP messaqe to a network management application (NMA) server;
 building an appropriate nodal model of said user request, including said SOAP message in said NMA server;
 sending SOAP encoded requests from said NMA server to a network element agent (NEA);
 parsing said SOAP encoded requests received by said NMA server in said NEA which encompasses data needed to complete a single nodal transaction;
 encoding in said NEA, said SOAP message to produce SOAP packets;
 transmitting said SOAP packets to a translator box associated with the application;
 translating said SOAP packets into an appropriate command for the application; and
 transmitting said command to the application.

20. The method in accordance with claim 19, further including the step of providing said web server at a localized location with respect to said web browser.

21. The method in accordance with claim 19, further including the step of modifying said user request prior to sending said request to said NMA server.

22. The method in accordance with claim 19, further including the step of transmitting said user request to a database for storage.

23. The method in accordance with claim 21, further including the step of transmitting said user request to a database for storage.

24. The method in accordance with claim 19, for communicating with a plurality of applications, further including the steps of:
   including a plurality of NEAs, each of said NEAs controlling at least one of the applications; and
   transmitting said SOAP encoded requests to a proper NEA.

25. The method in accordance with claim 24, further including the steps of:
   including a plurality of translator boxes, each of said translator boxes controlling at least one of the applications; and
   transmitting said SOAP packets to a proper application.

26. The method in accordance with claim 19, further including the step of translating said SOAP packets into an appropriate command in said translator box understood by the application.

27. The method in accordance with claim 11, further including the step of translating in said translator box an appropriate command from the application into SOAP nomenclature.

28. The method in accordance with claim 19, further including the step of translating in said translator box an appropriate command from the application into a SOAP nomenclature.

29. The method in accordance with claim 1, further including the step of transmitting said command from said translator box to said network element over the world wide web.

30. The method in accordance with claim 11, further including the step of transmitting said command from said translator box to said network element over the world wide web.

* * * * *